(12) United States Patent
Kyoda et al.

(10) Patent No.: US 10,086,592 B2
(45) Date of Patent: Oct. 2, 2018

(54) LABEL AND METHOD FOR PRODUCING LABEL

(71) Applicant: NIPPON CARBIDE INDUSTRIES, CO., INC., Minato-ku, Tokyo (JP)

(72) Inventors: Satoshi Kyoda, Uozu (JP); Shogo Nakada, Uozu (JP)

(73) Assignee: NIPPON CARBIDE INDUSTRIES, CO., INC., Minato-ku, Tokyo (JP)

( * ) Notice: Subject to any disclaimer, the term of this patent is extended or adjusted under 35 U.S.C. 154(b) by 0 days.

(21) Appl. No.: 15/030,910

(22) PCT Filed: Oct. 28, 2014

(86) PCT No.: PCT/JP2014/078662
§ 371 (c)(1),
(2) Date: Apr. 21, 2016

(87) PCT Pub. No.: WO2015/064589
PCT Pub. Date: May 7, 2015

(65) Prior Publication Data
US 2016/0263869 A1    Sep. 15, 2016

(30) Foreign Application Priority Data

Oct. 31, 2013 (JP) .................................. 2013-226296

(51) Int. Cl.
| | | |
|---|---|---|
| *B32B 27/06* | (2006.01) | |
| *B32B 37/06* | (2006.01) | |
| *B32B 38/10* | (2006.01) | |
| *B31D 1/02* | (2006.01) | |
| *G09F 3/10* | (2006.01) | |

(Continued)

(52) U.S. Cl.
CPC .............. *B32B 27/06* (2013.01); *B31D 1/021* (2013.01); *B31D 1/027* (2013.01); *B32B 3/14* (2013.01);

(Continued)

(58) Field of Classification Search
CPC ......... B32B 27/06; B32B 37/06; B32B 38/10; B32B 3/14; B32B 2305/72;
(Continued)

(56) References Cited

U.S. PATENT DOCUMENTS 7,835,047 B1 * 11/2010 Raraford ................ G03H 1/0011
283/86
2004/0209086 A1    10/2004 Koops et al.
(Continued)

FOREIGN PATENT DOCUMENTS

| JP | H11-117491 | 4/1999 |
|---|---|---|
| JP | 2003-108003 | 4/2003 |

(Continued)

OTHER PUBLICATIONS

Colour Index, Third Edition, vol. 3 (1971) 3278-81, 3330-31, 3370-73, 3378-89.

*Primary Examiner* — Laura C Powers
(74) *Attorney, Agent, or Firm* — Fitzpatrick Cella Harper and Scinto (57) ABSTRACT

A label 1 includes a first colored layer 10, a second colored layer 20 having a different color from the first colored layer 10, and an indicating layer 30 having a different color from the first colored layer 10 and the second colored layer 20. The indicating layer 30 is fitted into the first colored layer 10 so as to have an exposed surface on one surface of the first colored layer 10. The second colored layer 20 is laminated on the other surface F2 of the first colored layer 10. The curing shrinkage ratio of the first colored layer 10 is larger than that of the indicating layer 30.

23 Claims, 3 Drawing Sheets

(51) Int. Cl.
 *B32B 3/14* (2006.01)
 *G09F 3/02* (2006.01)
(52) U.S. Cl.
 CPC .............. *B32B 37/06* (2013.01); *B32B 38/10* (2013.01); *G09F 3/02* (2013.01); *G09F 3/10* (2013.01); *B32B 2305/72* (2013.01); *B32B 2307/402* (2013.01); *B32B 2307/404* (2013.01); *B32B 2519/00* (2013.01); *G09F 2003/0211* (2013.01); *G09F 2003/0276* (2013.01)
(58) Field of Classification Search
 CPC ........ B32B 2307/404; B32B 2307/402; B32B 2519/00; B31D 1/027; B31D 1/021; G09F 3/10; G09F 3/02; G09F 3/00; G09F 2003/0211; G09F 2003/0276
 See application file for complete search history.

(56) References Cited

U.S. PATENT DOCUMENTS

| 2008/0076065 | A1 | 5/2008 | Bennett et al. | |
|---|---|---|---|---|
| 2008/0145612 | A1 | 6/2008 | Church et al. | |
| 2010/0189979 | A1* | 7/2010 | Takeda | B32B 27/20 428/216 |
| 2011/0281041 | A1* | 11/2011 | Mazini | G09F 3/0292 428/29 |
| 2012/0021188 | A1* | 1/2012 | White | G09F 3/0292 428/195.1 |

FOREIGN PATENT DOCUMENTS

| JP | 2005-501162 | 1/2005 |
|---|---|---|
| JP | 2007-021818 | 2/2007 |

\* cited by examiner

FIG. 8

LABEL AND METHOD FOR PRODUCING LABEL

This application is a national phase of PCT Application No. PCT/JP2014/078662 filed Oct. 28, 2014, which in turn claims benefit of Japanese Application No. JP 2013-226296 filed Oct. 31, 2013.

TECHNICAL FIELD

The present invention relates to a label and a method for producing the label, and is suitable in a case of printing using a laser.

BACKGROUND ART

In general, it is widely performed as part of product management, quality assurance, or the like to paste a label on which information such as a production number or an expiration date is printed on a product.

As such a label, the following label has been proposed (refer to Patent Literature 1). That is, the label is obtained by applying an engraving layer including a UV-curable lacquer on a supportive backing film by printing, applying a base layer including an electron beam-curable lacquer on the engraving layer, and curing the base layer by irradiation with an electron beam. Information is printed on this label by removing the engraving layer at a desired location with a laser.

[Patent Literature 1] JP2005-501162 A

SUMMARY OF INVENTION

However, when the engraving layer or the basic layer is thick, the label of Patent Literature 1 may be insufficiently cured because an ultraviolet ray or an electron beam does not reach a deep portion of the engraving layer or the basic layer. In this case, peeling may occur between the layers of the label, or cracking may occur.

Therefore, an object of the present invention is to provide a label which can suppress peeling between the layers or cracking and has excellent durability regardless of the thickness of the layer of the label, and a method for producing the label.

In order to achieve the above object, the label according to the present invention includes a first colored layer, a second colored layer having a different color from the first colored layer, and an indicating layer having a different color from the first colored layer and the second colored layer. The indicating layer is fitted into the first colored layer so as to have an exposed surface on one surface of the first colored layer. The second colored layer is laminated on the other surface of the first colored layer. The curing shrinkage ratio of the first colored layer is larger than that of the indicating layer.

In such a label, the curing shrinkage ratio of the first colored layer is larger than that of the indicating layer embedded in the first colored lever, and therefore the first colored layer holds the indicating layer due to curing. Therefore, it is possible to enhance adhesion between the first colored layer and the indicating layer regardless of the thickness of the first colored layer or the indicating layer. In this way, it is possible to provide a label which can suppress peeling between the first colored layer and the indicating layer or cracking and has excellent durability.

As described above, the label according to the present invention has excellent adhesion between the first colored layer and the indicating layer. Therefore, the label can contribute to preventing counterfeiting of removing the indicating layer, and can suppress peeling of the indicating layer when information is printed by removing the indicating layer and the first colored layer at desired locations with a laser and exposing the second colored layer.

An area ratio of the exposed surface of the indicating layer is preferably 1% or more and 50% or less with respect to a surface area of one surface of the label. That is, for example, in FIG. 1, the area ratio is preferably 1% or more and 50% or less with respect to an area of one surface F1 including exposed surfaces of a first colored layer 10 and an indicating layer 30. The area ratio of the exposed surface of the indicating layer is more preferably 1% or more and 40% or less with respect to a surface area of one surface of the label. The area ratio is still more preferably 1% or more and 30% or less.

The present inventors have found that adhesion between the first colored layer and the indicating layer is further enhanced by setting the area ratio of the exposed surface of the indicating layer to 1% or more and 50% or lees with respect to a surface area of one surface of the label. In addition, the present inventors have found that adhesion between the first colored layer and the indicating layer is further enhanced and that cracking is further suppressed by setting the area ratio of the exposed surface of the indicating layer to 1% or more and 40% or less with respect to a surface area of one surface of the label.

A crosslinking agent used for the first colored layer preferably reacts with a functional group of a resin included in the indicating layer.

In this case, a crosslinking reaction occurs also between the first colored layer and the indicating layer. Therefore, adhesion between the layers can be further enhanced.

A crosslinking agent used for the second colored layer preferably reacts with a functional group of a resin included in the first colored layer and a functional group of a resin included in the indicating layer.

In this case, adhesion between the second colored layer and the first colored layer can be further enhanced. The crosslinking agent used for the second colored layer permeates the first colored layer, and adhesion between the first colored layer and the indicating layer can be further enhanced.

The method for producing a label according to the present invention includes an indicating layer forming step of forming an indicating layer by applying a resin coating material onto one surface of a substrate and then heating the resin coating material, a first colored layer forming step of forming a first colored layer by applying a resin coating material having a different color from the resin coating material used in the indicating layer forming step onto the one surface of the substrate and a surface of the indicating layer and then heating the resin coating material, a second colored layer forming step of forming a second colored layer by applying a resin coating material having a different color from the resin coating material used in the indicating layer forming step or the resin coating material used in the first colored layer forming step onto a surface of the first colored layer and then heating the resin coating material, and a peeling step of peeling the substrate from the indicating layer and the first colored layer. The curing shrinkage ratio of the first colored layer is larger than that of the indicating layer.

In such a production method, the curing shrinkage ratio of the first colored layer is larger than that of the indicating layer embedded in the first colored layer, and therefore the first colored layer holds the indicating layer due to curing.

Therefore, it is possible to enhance adhesion between the first colored layer and the indicating layer regardless of the thickness of the first colored layer or the indicating layer. In this way, it is possible to provide a label which can suppress peeling between the first colored layer and the indicating layer or cracking and has excellent durability.

As described above, the present invention can provide a label which prevents peeling between the layers of the label or cracking and has excellent durability regardless of the thickness of the layer of the label, and a method for producing the label.

DESCRIPTION OF EMBODIMENTS

Hereinafter, an embodiment according to the present invention will be described in detail with reference to the drawings. However, the present invention is not limited in any way to the present embodiment.

Figure 1:
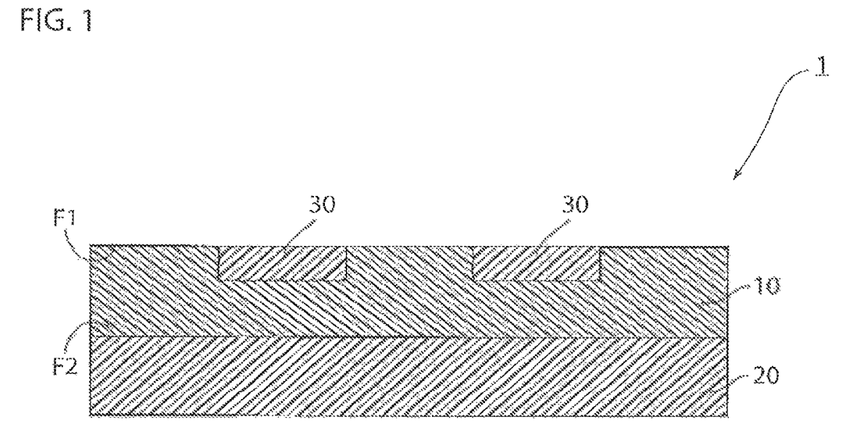
FIG. 1 is a view illustrating a cross section of a label in the present embodiment.

FIG. 1 is a view illustrating a cross section of a label in the present embodiment. A label 1 of the present embodiment includes a first colored layer 10, a second colored layer 20, and an indicating layer 30 as main components thereof. The first colored layer 10 has one surface F1 including an exposed surface of the indicating layer 30 and the other surface F2 in contact with the second colored layer 20.

For example, the first colored layer 10 is formed from a thermosetting resin coating material containing a resin, a crosslinking agent, a colorant, and an organic solvent. If desired, the resin coating material may contain a stabilizer, a flame retardant, an antioxidant, an antistatic agent, a fungicide, a lubricant, a filler, or the like. The first colored layer 10 has a different color from the second colored layer 20 and the indicating layer 30.

Examples of the resin used for the resin coating material include an acrylic resin, an epoxy resin, and a urethane resin.

The colorant used for the resin coating material is not particularly limited, but is preferably a colorant which can be removed by irradiation with laser light and can be used for a long time with weather resistance and durability. For example, the colorant can be selected from Color Index 3rd Edition (1971) and Supplements (1975) issued by The Society of Dyes and Colourists. Examples thereof include an inorganic pigment, an organic pigment, an azo pigment, a condensed polycyclic pigment, and a metal complex salt pigment. More specifically, examples of the inorganic pigment include zinc white, zinc sulfide, titanium dioxide, calcium carbonate, silica, white mica, carbon black, iron black, iron oxide yellow, titanium-antimony-nickel oxide, and aluminum powder, and examples of the organic pigment include aniline black and perylene black. However, the pigment is not limited thereto.

The first colored layer 10 has a curing shrinkage ratio larger than the indicating layer 30. In this case, the cross-linking agent used for the resin coating material of the first colored layer preferably dissociates a molecule in a crosslinking reaction. Examples of such a crosslinking agent include a melamine crosslinking agent, a benzoguanamine crosslinking agent, a urea crosslinking agent, and a metal chelate crosslinking agent. The melamine crosslinking agent, the benzoguanamine crosslinking agent, and the urea crosslinking agent each have a hydroxy group or an imino group as a functional group, for example. These functional groups generate water in a crosslinking reaction, and the resulting water is eliminated from the reaction system by drying or the like. The volume is reduced by the amount of the eliminated water. Therefore, the curing shrinkage ratio is increased in a crosslinking reaction using a melamine crosslinking agent, a benzoguanamine crosslinking agent, or a urea crosslinking agent. The metal chelate crosslinking agent contains a metal and a chelating agent. The chelating agent is eliminated and discharged out of the reaction system (for example, into the air) in a crosslinking reaction of the metal chelate crosslinking agent. The volume is reduced by the amount of the eliminated chelating agent. Therefore, curing shrinkage occurs in the crosslinking reaction using the metal chelate crosslinking agent. The melamine crosslinking agent, the benzoguanamine crosslinking agent, and the urea crosslinking agent each have a larger curing shrinkage ratio than the metal chelate crosslinking agent, and therefore are preferable. The melamine crosslinking agent is more preferable.

Examples of the melamine crosslinking agent include melamine, a methylolated melamine derivative obtained by condensation of melamine and formaldehyde, a compound obtained by allowing methylolated melamine to react with a lower alcohol to be partially or completely etherified, and a mixture thereof. The melamine crosslinking agent may be a monomer, a condensate formed of a polymer of a dimer or more, or a mixture thereof. More specific examples thereof include an imino group type methylated melamine resin, a methylol group type melamine resin, a methylol group type methylated melamine resin, and a complete alkyl type methylated melamine resin.

Examples of the benzoguanamine crosslinking agent include benzoguanamine, a methylolated benzoguanamine derivative obtained by condensation of benzoguanamine and formaldehyde, a compound obtained by allowing methylolated benzoguanamine to react with a lower alcohol to be partially or completely etherified, and a mixture thereof. The benzoguanamine crosslinking agent may be a monomer, a condensate formed of a polymer of a dimer or more, or a mixture thereof. More specific examples thereof include a butylated benzoguanamine resin and a methylolated benzoguanamine resin.

Examples of the urea crosslinking agent include a methylolated urea derivative obtained by condensation of urea and formaldehyde, a compound obtained by allowing methylolated urea to react with a lower alcohol to be partially or completely etherified, and a mixture thereof. The urea crosslinking agent may be a monomer, a condensate formed of a polymer of a dimer or more, or a mixture thereof. More specific examples thereof include a butylated urea resin and a methylolated urea resin.

Examples of the metal chelate crosslinking agent include an aluminum chelate crosslinking agent, a zirconium chelate crosslinking agent, a titanium chelate cross-linking agent, a chromium chelate crosslinking agent, a cobalt chelate crosslinking agent, a copper chelate crosslinking agent, an iron chelate crosslinking agent, a nickel chelate crosslinking agent, a vanadium chelate crosslinking agent, a zinc chelate crosslinking agent, an indium chelate crosslinking agent, a calcium chelate crosslinking agent, a magnesium chelate crosslinking agent, a manganese chelate crosslinking agent, an yttrium chelate crosslinking agent, a cerium chelate crosslinking agent, a strontium chelate crosslinking agent, a barium chelate crosslinking agent, a molybdenum chelate crosslinking agent, a lanthanum chelate crosslinking agent, and a tin chelate crosslinking agent. Preferable examples thereof include an aluminum chelate crosslinking agent, a zirconium chelate crosslinking agent, and a titanium chelate crosslinking agent. More preferable examples thereof include an aluminum chelate crosslinking agent.

The second colored layer 20 is laminated on the surface F2 opposite to the one surface F1 of the first colored layer 10 including an exposed surface of the indicating layer 30. The second colored layer 20 has a different color from the first colored layer 10 or the indicating layer 30. For example, the second colored layer 20 is formed from a thermosetting resin coating material containing a resin, a crosslinking agent, a colorant, and an organic solvent. If desired, the resin coating material may contain a stabilizer, a flame retardant, an antioxidant, an antistatic agent, a fungicide, a lubricant, a filler, or the like. In the present embodiment, the resin and the crosslinking agent in the resin coating material are preferably mixed immediately before the resin coating material is applied.

Examples of the resin used for the resin costing material include an acrylic resin, an epoxy resin, and a urethane resin.

The colorant used for the resin coating material is not particularly limited, but is preferably a colorant which can be removed by irradiation with laser light and can be used for a long time with weather resistance and durability. For example, the colorant can be selected from Color Index 3rd Edition (1971) and Supplements (1975) issued by The Society of Dyes and Colourists. Examples thereof include an inorganic pigment, an organic pigment, an azo pigment, a condensed polycyclic pigment, and a metal complex salt pigment. More specifically, examples of the inorganic pigment include zinc white, zinc sulfide, titanium dioxide, calcium carbonate, silica, white mica, carbon black, and iron black, and examples of the organic pigment include aniline black and perylene black. However, the pigment is not limited thereto.

The crosslinking agent used for the resin coating material of the second colored layer 20 preferably makes the curing shrinkage ratio of the second colored layer 20 smaller than that of the first colored layer 10. By using the second colored layer 20 having a smaller curing shrinkage ratio than the first colored layer 10, when the second colored layer 20 is stuck to a hard substrate having a not-shrinking surface or the like on the opposite side to the first colored layer 10, it is possible to relieve a stress caused by a difference in the shrinkage ratio between the first colored layer 10 and the substrate or the like and to suppress cracking or the like. Examples of the crosslinking agent include an isocyanate crosslinking agent, an epoxy crosslinking agent, and an acid anhydride crosslinking agent. Furthermore, the isocyanate crosslinking agent is preferable from a viewpoint of enhancing adhesion between the second colored layer 20 and the first colored layer 10, adhesion between the first colored layer 10 and the indicating layer 30, or durability. The isocyanate crosslinking agent has an isocyanate group as a functional group. For example, an isocyanate group performs a crosslinking reaction by reacting with a functional group having an active hydrogen atom such as a hydroxy group or an amino group included in the indicating layer 30 or the first colored layer 20. In principle, this reaction does not eliminate any molecule. However, the crosslinking agent and the resin are bonded to each other by a reaction between the functional groups thereof. The intermolecular distance is reduced, and curing shrinkage thereby occurs. Therefore, the resin including an isocyanate crosslinking agent has a smaller curing shrinkage ratio than a resin including a melamine crosslinking agent, a benzoguanamine crosslinking agent, a urea crosslinking agent, or a metal chelate crosslinking agent. When the resin includes a carboxyl group as a functional group or water exists as impurities, the isocyanate group reacts therewith to generate carbon dioxide. In this case, carbon dioxide is eliminated to increase the curing shrinkage ratio. However, even in this case, the resin including an isocyanate crosslinking agent usually has a smaller curing shrinkage ratio than a resin including a melamine crosslinking agent, a benzoguanamine crosslinking agent, a urea crosslinking agent, or a metal chelate crosslinking agent.

The isocyanate crosslinking agent is only required to have an isocyanate group bonded to an organic compound having about 1 to 1000 carbon atoms. Examples thereof include tolylene diisocyanate, xylene diisocyanate, diphenylmethane diisocyanate, hexamethylene diisocyanate, isophorone diisocyanate, 1,4-cyclohexane-bis-methyl isocyanate, 4,4-methylene-bis-cyclohexyl isocyanate, a tolylene diisocyanate-3-functional alcohol adduct, an isophorone diisocyanate-2 functional alcohol adduct, an isophorone diisocyanate-3 functional alcohol adduct, a hexamethylene diisocyanate-2 functional alcohol adduct, a hexamethylene diisocyanate-3 functional alcohol adduct, a tolylene diisocyanate trimer, an isopborone diisocyanate trimer, a hexamethylene diisocyanate trimer, a biuret type hexamethylene diisocyanate trimer, n-butyl isocyanate, n-hexyl isocyanate, trimethyl silicon isocyanate, dimethyl silicone diisocyanate, and monomethyl silicon triisocyanate.

Among these isocyanate crosslinking agents, an aliphatic isocyanate crosslinking agent such as hexamethylene diisocyanate, isophorone diisocyanate, 1,4-cyclohexane-bis-methyl isocyanate, 4,4-methylene-bis-cyclohexyl isocyanate, an isophorone diisocyanate-2 functional alcohol adduct, an isophorone diisocyanate-3 functional alcohol adduct, a hexamethylene diisocyanate-2 functional alcohol adduct, or a hexamethylene diisocyanate-3 functional alcohol adduct is preferable. Hexamethylene diisocyanate is particularly preferable.

Examples of the epoxy crosslinking agent include an epoxy resin obtained by epoxidizing a novolac resin obtained by condensation or co-condensation between a phenol such as phenol, cresol, xylene, resorcin, catechol, bisphenol A, or bisphenol F and/or a naphtol such as α-naphthol, β-naphthol, or dihydroxy naphthalene, and a compound having an aldehyde group such as formaldehyde, acetaldehyde, propionaldehyde, benzaldehyde, or salicylaldehyde in the presence of an acidic catalyst, such as triglycidyl isocyanurate or a phenol novolac epoxy resin; a diglycidyl ether of bisphenol A, bisphenol F, bisphenol S, bisphenol A/D, or the like; a biphenyl epoxy resin which is a glycidyl ether of an alkyl-substituted or non-substituted biphenol; an epoxidized compound of a phenol-aralkyl resin, a naphthol-aralkyl resin, a biphenyl-aralkyl resin, or the like synthesized from a phenol and/or a naphthol and dimethoxy p-xylene or bis(methoxymethyl) biphenyl; a stilbene epoxy resin; a hydroquinone epoxy resin; a glycidyl ester epoxy resin obtained by a reaction between epichlorohydrin and a polybasic acid such as phthalic acid or dimer acid; a dicyclopentadiene epoxy resin; an epoxy resin having a naphthalene ring; a triphenyl methane epoxy resin; a trimethylol propane epoxy resin; a modified terpene epoxy resin; an epoxy resin containing a sulfur atom; an aliphatic epoxy resin obtained by oxidizing an olefin bond with a peroxide; an alicyclic epoxy resin; and an epoxy resin obtained by modifying these epoxy resins with a silicone rubber, an acrylonitrile rubber, a butadiene rubber, an isoprene rubber, a polyamide resin, or the like.

Examples of the acid anhydride crosslinking agent include phthalic anhydride, maleic anhydride, trimellitic anhydride, pyromellitic anhydride, hexahydrophthalic anhydride, 3-methyl-hexahydrophthalic anhydride, 4-methyl-hexahydrophthalic anhydride, tetrahydro phthalic anhydride, nadic anhydride, and methylnadic anhydride.

The indicating layer 30 indicates a mark such as a character, a symbol, or a graphic, and has a different color from the first colored layer 10 and the second colored layer 20. The color of the indicating layer 30 includes a transparent color as long as the color is different from the first colored layer 10 and the second colored layer 20. When the color of the indicating layer 30 as transparent, the indicating layer 30 can make an inconspicuous indication. This case is suitable for indicating a watermark. The indicating layer 30 is formed from a thermosetting resin coating material containing a resin, a crosslinking agent, a colorant, and an organic solvent. If desired, the resin coating material may contain a stabilizer, a flame retardant, an antioxidant, an antistatic agent, a fungicide, a lubricant, a filler, or the like. In the present embodiment, the thermosetting resin and the crosslinking agent in the resin coating material are preferably mixed immediately before the resin coating material is applied.

Examples of the resin used for the resin coating material include an acrylic resin, an epoxy resin, and a urethane resin. The crosslinking agent used for the resin coating material of the indicating layer 30 preferably makes the curing shrinkage ratio of the indicating layer 30 smaller than that of the first colored layer 10. Examples of the crosslinking agent include an isocyanate crosslinking agent, an epoxy crosslinking agent, and an acid anhydride crosslinking agent. Furthermore, the isocyanate crosslinking agent is preferable from a viewpoint of enhancing adhesion between the second colored layer 20 and the first colored layer 10, adhesion between the first colored layer 10 and the indicating layer 30, or durability. The isocyanate crosslinking agent has an isocyanate group as a functional group. For example, an isocyanate group performs a crosslinking reaction by reacting with a functional group having an active hydrogen atom such as a hydroxy group or an amino group included in the indicating layer 30 or the first colored layer 20. In principle, this reaction does not eliminate any molecule. However, the crosslinking agent and the resin are bonded to each other by a reaction between the functional groups thereof. The intermolecular distance is reduced, and curing shrinkage thereby occurs. Therefore, the resin including an isocyanate crosslinking agent has a smaller curing shrinkage ratio than a resin including a melamine crosslinking agent, a benzoguanamine crosslinking agent, a urea crosslinking agent, or a metal chelate crosslinking agent. When the resin includes a carboxyl group as a functional group or water exists as impurities, the isocyanate group reacts therewith to generate carbon dioxide. In this case, carbon dioxide is eliminated to increase the curing shrinkage ratio. However, even in this case, the resin including an isocyanate crosslinking agent usually has a smaller curing shrinkage ratio than a resin including a melamine crosslinking agent, a benzoguanamine crosslinking agent, a urea crosslinking agent, or a metal chelate crosslinking agent.

The colorant used for the resin coating material of the indicating layer 30 is not particularly limited, but is preferably a colorant which can be removed by irradiation with laser light and can be used for a long time with weather resistance and durability. For example, the colorant can be selected from Color index 3rd Edition (1971) and Supplements (1975) issued by The Society of Dyes and Colourists. Examples thereof include an inorganic pigment, an organic pigment, an azo pigment, a condensed polycyclic pigment, and a metal complex salt pigment. More specifically, examples of the inorganic pigment include zinc white, sine sulfide, titanium dioxide, calcium carbonate, silica, white mica, carbon black, and iron black, and examples of the organic pigment include aniline black and perylene black. However, the pigment is not limited thereto.

The crosslinking agent used for the resin coating materiel of the indicating layer 30 preferably makes the curing shrinkage ratio of the indicating layer 30 smaller than that of the first colored layer 10. Examples of the crosslinking agent include an isocyanate crosslinking agent, an epoxy crosslinking agent, and an acid anhydride crosslinking agent. Furthermore, the isocyanate crosslinking agent is preferable from a viewpoint of enhancing adhesion between the indicating layer 30 and the first colored layer 10, adhesion between the first colored layer 10 and the indicating layer 30, or durability. As described above, the isocyanate crosslinking agent has a smaller curing shrinkage ratio than a resin including a melamine crosslinking agent, a benzoguanamine crosslinking agent, a urea crosslinking agent, or a metal chelate crosslinking agent. Therefore, when a resin including a melamine crosslinking agent, a benzoguanamine crosslinking agent, a urea crosslinking agent, or a metal chelate crosslinking agent is used for the resin coating material of the first colored layer 10, an isocyanate crosslinking agent is preferable as a crosslinking agent used for the resin coating material of the indicating layer 30. Other examples thereof include an epoxy crosslinking agent and an acid anhydride crosslinking agent.

By the way, the crosslinking agent used for the first colored layer 10 preferably reacts with a resin included in the indicating layer 30, or a crosslinking agent used for the indicating layer 30 preferably reacts with a resin included in the first colored layer 10. As a combination of the crosslinking agent used for the first colored layer 10 and the resin included in the indicating layer 30, for example, the crosslinking agent used for the first colored layer 10 is only required to have an isocyanate group, and the indicating layer 30 is only required to include a resin having a hydroxy group such as 2-hydroxy ethyl methacrylate. In this case, it is considered that at least one of the crosslinking agent used for the first colored layer 10 and the resin included in the indicating layer 30 oozes to the second colored layer 20 to cause a crosslinking reaction. As a combination of a crosslinking agent used for the indicating layer and the resin included in the first colored layer 10, for example, the crosslinking agent used for the indicating layer 30 is only required to be a melamine crosslinking agent, and the first colored layer 10 is only required to include a resin having a hydroxy group. In this case, it is considered that at least one of the resin included in the first colored layer 10 and the crosslinking agent used for the indicating layer 30 oozes to the second colored layer 20 to cause a crosslinking reaction.

The indicating layer 30 in the present embodiment has an exposed surface on the one surface F1 of the first colored layer 10. An area ratio of the exposed surface of the indicating layer 30 is preferably 1% or more and 50% or less, and more preferably 1% or more and 40% or less with respect to a surface area of the one surface F1 of the label from a viewpoint of enhancing adhesion between the indicating layer 30 and the first colored layer 10. The area ratio is still more preferably 1% or more and 30% less.

In the label 1, the thickness of the first colored layer 10 is preferably from 3 to 30 micrometers, the thickness of the second colored layer 20 is preferably from 40 to 120 micrometers, and the thickness of the indicating layer 30 is preferably from 0.5 to 30 micrometers.

The first colored layer 10, the second colored layer 20, and the indicating layer 30 have different colors from one another. In this case, a boundary between the first colored layer 10 and the second colored layer 20 can be recognized visually, and a boundary between the first colored layer 10 and the indicating layer 30 can be recognized visually. In addition, a boundary between the second colored layer 20 and the indicating layer 30 can be recognized visually. Therefore, when information is printed by removing the indicating layer and the first colored layer at desired locations with a laser and exposing the second colored layer, the second colored layer 20 can be recognized visually. Therefore, the label 1 of the present embodiment is useful as a label for laser marking.

As described above, in the label 1 of the present embodiment, the curing shrinkage ratio of the first colored layer 10 is larger than that of the indication layer 30, and therefore the first colored layer 10 holds the indicating layer 30 due to curing. Therefore, the label 1 of the present embodiment can enhance adhesion between the first colored layer 10 and the indicating layer 30 regardless of the thickness of the first colored layer 10 or the indicating layer 30.

In this way, the label 1 of the present embodiment can suppress peeling between the first colored layer 10 and the indication layer 30 or cracking.

When a melamine crosslinking agent is used as a crosslinking agent used for the first colored layer 10, adhesion between the first colored layer 10 and the indicating layer 30 can be further enhanced.

When an isocyanate crosslinking agent is used as a crosslinking agent used for the second colored layer 20, adhesion between the second colored layer 20 and the first colored layer 10 and adhesion between the first colored layer 10 and the indicating layer 30 can be further enhanced.

In the label 1 of the present embodiment, the first colored layer 10, the second colored layer 20, and the indicating layer 30 are cured by heat. Therefore the label 1 of the present embodiment suppresses peeling between the layers of the label or cracking and has excellent durability regardless of the thickness of the first colored layer 10, the second colored layer 20, or the indicating layer 30.

Figure 2:
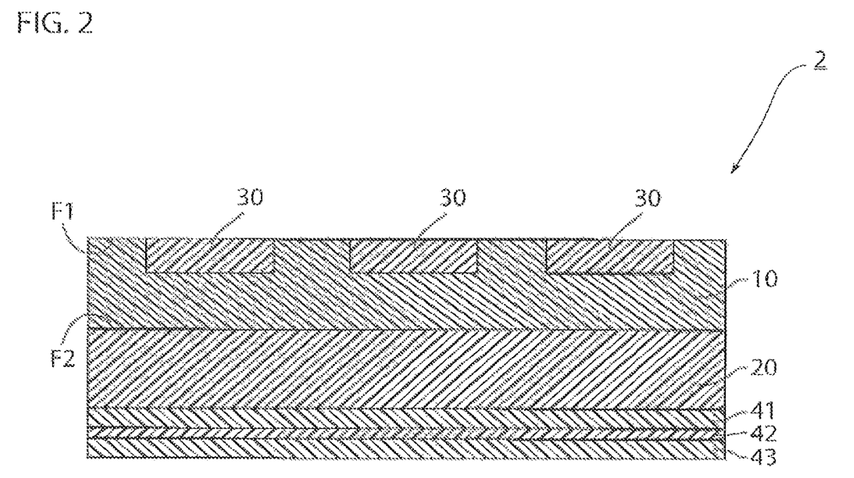
FIG. 2 is a view illustrating a cross section of a label in another embodiment.

FIG. 2 is a view illustrating a cross section of a label 2 in another embodiment. As illustrated in FIG. 2, the label 2 of the present embodiment can provide a brittle layer 41, an adhesive layer 42, and a peeling layer 43 in addition to the first colored layer 10, the second colored layer 20, and the indicating layer 30.

When the brittle layer 41 is peeled after a label obtained by peeling the peeling layer 43 is pasted on a product, the brittle layer 41 is broken such that the label cannot be reused.

The brittle layer 41 is formed from a resin coating material including the resin coating material used for the second colored layer 20 and a brittleness-imparting component.

Examples of the brittleness-imparting component of the resin coating material used for the brittle layer 41 include inorganic particles such as glass beads, silica, or calcium carbonate and organic particles such as acrylic beads, styrene beads, or silicone beads.

Figure 3:
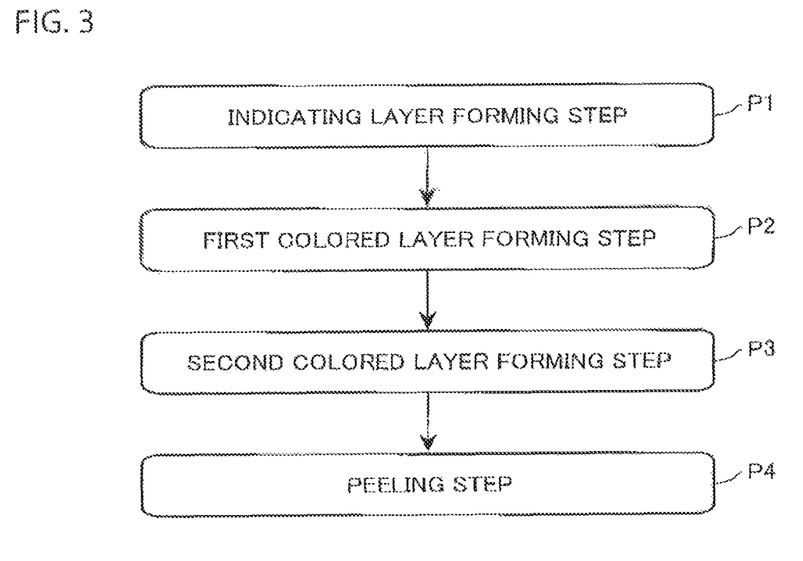
FIG. 3 is a flowchart illustrating a method for producing a label.

Next, a method for producing the label 1 will be described. FIG. 3 is a flowchart illustrating a method for producing the label 1. As illustrated in FIG. 3, the method for producing the label 1 includes an indicating layer forming step P1, a first colored layer forming step P2, a second colored layer forming step P3, and a peeling step P4 as main steps thereof.

(Indicating Layer Forming Step P1)

Figure 4:
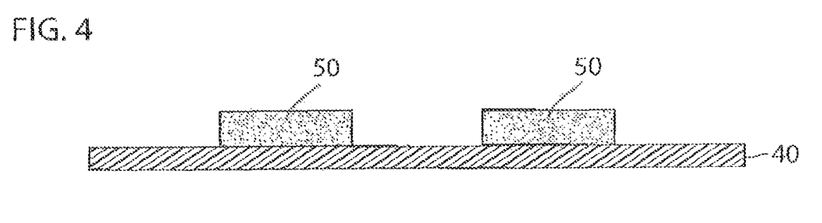
FIG. 4 is a view illustrating the indicating layer forming step.

In the indicating layer forming step P1, the indicating layer 30 is formed. FIG. 4 is a view illustrating the indicating layer forming step P1. As illustrated in FIG. 4, in this step, a resin coating material 50 is applied onto one surface of a substrate 40 so as to form a pattern indicating a predetermined mark as a first stage.

Examples of the substrate 40 include a film obtained by surface-treating one surface of PET, PEN, paper, or the like with a coating agent including a polyolefin, silicone, fluorine, silica, beads, wax, or the like, and an untreated PET or PEN film. The substrate 40 may be further subjected to an embossing treatment, a corona treatment, or the like.

A method for applying the resin coating material 50 onto one surface of the substrate 40 is not particularly limited. Examples thereof include a gravure printing method, a screen printing method, and seal printing.

As a second stage, the resin coating material 50 applied onto one surface of the substrate 40 is heated and cured to form the indicating layer 30 having a pattern indicating a predetermined mark.

In this step P1, the resin coating material 50 cured by heat is used. Therefore, curing can be performed uniformly regardless of the thickness of the resin coating material 50 to obtain the indicating layer 30 having a sufficient strength.

(First Colored Layer Forming Step P2)

Figure 5:
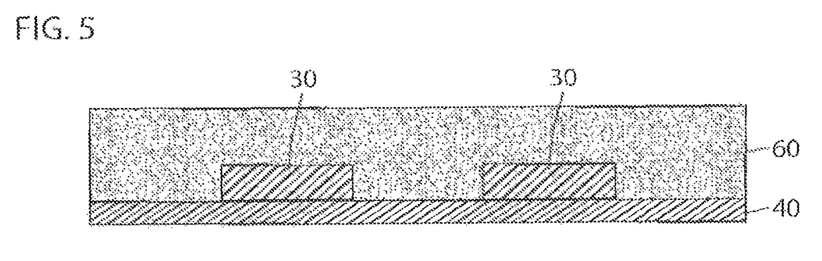
FIG. 5 is a view illustrating the first colored layer forming step.

In the first colored layer forming step P2, the first colored layer 10 is formed. As illustrated in FIG. 5, in this step, a resin coating material 60 is applied onto one surface of the substrate 40 and the surface of the indicating layer 30 as a first stage.

As a second stage, the resin coating material 60 applied onto the one surface of the substrate 40 and the surface of the indicating layer 30 is heated and cured to form the first colored layer 10.

In this step P2, the resin coating material 60 cured by heat is used. Therefore, curing can be performed uniformly regardless of the thickness of the resin coating material 60 to obtain the first colored layer 10 having a sufficient strength.

(Second Colored Layer Forming Step P3)

Figure 6:
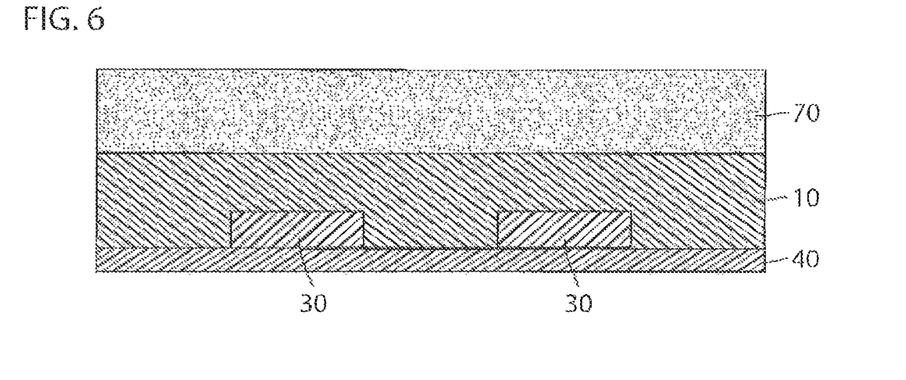
FIG. 6 is a view illustrating the second colored layer forming step.

In the second colored layer forming step P3, the second colored layer 20 is formed. FIG. 6 is a view illustrating the second colored layer forming step P3. As illustrated in FIG. 6, in this step, a resin coating material 70 is applied onto one surface of the first colored layer 10 formed in the first colored layer forming step P2 as a first stage. As a second stage, the resin coating material 70 is heated and cured to form the second colored layer 20.

In this step P3, the resin coating material 70 cured by heat is used. Therefore, caring can be performed uniformly regardless of the thickness of the resin coating material 70 to obtain the second colored layer 20 having a sufficient strength.

(Peeling Step P4)

Figure 7:
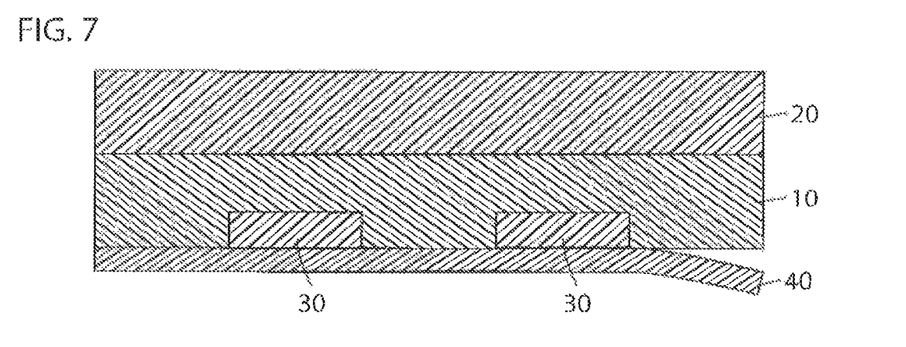
FIG. 7 is a view illustrating the peeling step.

In the peeling step P4, the substrate 40 is peeled from the indicating layer 30 and the first colored layer 10. FIG. 7 is a view illustrating the peeling step P4.

As described above, the curing shrinkage ratio of the first colored layer 10 is larger than that of the indicating layer 30 embedded in the first colored layer 10, and the first colored layer 10 holds the indicating layer 30 due to curing. Therefore, adhesion between the first colored layer 10 and the indicating layer 30 is high. Therefore, even when the substrate 40 is pealed in the peeling step P4, the indicating layer 30 is not separated from the first colored layer 10.

Hitherto, the method for producing the label 1 has been described. The label 2 can be produced by providing a brittle layer forming step and an adhesive layer and peeling layer forming step before the peeling step P4. In this case, the brittle layer forming step is performed following the second colored layer forming step P3 to form the brittle layer 41 on one surface of the second colored layer 20.

Information can be printed on the label 1 or 2 produced in this way with a laser. For example, information can be printed by removing a part of the first colored layer 10 and the indicating layer 30 with a laser and exposing the second colored layer 20.

Figure 8:
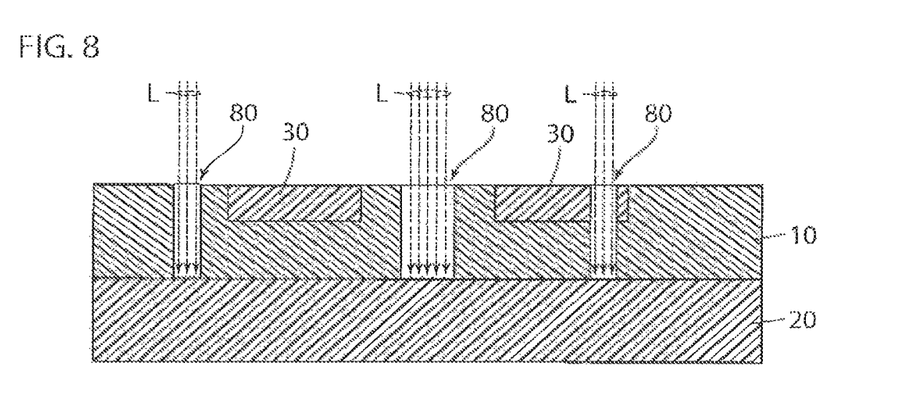
FIG. 8 is a view illustrating a removing step.

FIG. 8 illustrates the label 1 on which information such as a character or a graphic is printed with a laser. As illustrated in FIG. 8, the first colored layer 10 and the indicating layer 30 are irradiated with laser light L to form a removing part 80. As a result, when a surface which is irradiated with the laser light L is observed, information can be recognized visually by comparing the removing part 80 with a non-removing part. At the time of irradiation with the laser light L, even a part of the second colored layer 20 may be removed.

EXAMPLES

Hereinafter, the present invention will be described specifically by showing Examples and Comparative Examples, but is not limited in any way to these Examples.

<Preparation 1>

50 parts by weight of an acrylic resin KP-2341 (manufactured by Nissetsu Co., Ltd.), 50 parts by weight of an acrylic resin Hi-S SP2100U4 (manufactured by Nippon Carbide Industries Co., Inc.), 18 parts by weight of a melamine crosslinking agent MS-11 (manufactured by Sanwa Chemicals Co., Ltd.), 0.3 parts by weight of a phosphoric acid ester CT-198 (manufactured by Sanwa Chemical Co., Ltd.), and 15 parts by weight of a colorant FPGS-5910B (manufactured by Dainichiseika Color & Chemicals Mfg. Co., Ltd.) were mixed to prepare a resin coating material for forming the first colored layer.

The acrylic resin KP-2341 used in Preparation 1 contains 2-hydroxy ethyl methacrylate which is a resin having a hydroxy group as a functional group. The acrylic resin Hi-S SP2100U4 used in Preparation 1 contains 2-hydroxy ethyl methacrylate which is a resin having a hydroxy group as a functional group and an acrylic acid which is a resin having a carboxyl group as a functional group.

<Preparation 2>

50 parts by weight of an acrylic resin Hi-S SP2100U4 (manufactured by Nippon Carbide Industries Co., Inc.), 100 parts by weight of a colorant FPGS-5010W (manufactured by Dainichiseika Color & Chemicals Mfg. Co., Ltd.), 16 parts by weight of an isocyanate crosslinking agent Coronate HK (manufactured by Nippon Polyurethane Industry Co., Ltd.), and 5 parts by weight of PTMG-1000M (manufactured by Sanyo Chemical Industries, Ltd.) were mixed to prepare a resin coating material for forming the second colored layer.

<Preparation 3>

100 parts by weight of an ink MA31 OP varnish (manufactured by Fuji Printing Ink Mfg. Co., Ltd.) containing an acrylic epoxy resin and a colorant and 10 parts by weight of an isocyanate crosslinking agent NX hardener (manufactured by Fuji Printing Ink Mfg. Co., Ltd.) were mixed to prepare a resin coating material for forming the indicating layer.

Example 1

A pattern of a character, a graphic, or the like was printed on a PET film (S75 manufactured by Teijin DuPont Films Limited) as a substrate using the resin coating material in Preparation 3 by gravure printing such that an area ratio of an exposed surface of an indicating layer was 0.8% with respect to a surface area of one surface of the label to obtain the indicating layer having a thickness of 2 micrometers. Subsequently, the resin coating material in Preparation 1 was applied onto a part of the substrate and the indicating layer, and was heated at 150° C. for three minutes to form the first colored layer having a thickness of 15 micrometers.

Subsequently, the resin coating material in Preparation 2 was applied onto the first colored layer so as to have a thickness of 60 micrometers after being heated, was heated at 140° C. for three minutes, and was subsequently heated at 150° C. for two minutes to obtain the second colored layer. Finally, the substrate was peeled to produce a label.

Example 2

A label was produced using the resin coating material in Preparation 3 in a similar manner to Example 1 except that printing was performed such that the area ratio of the exposed surface of the indicating layer was 1% with respect to the surface area of one surface of the label.

Example 3

A label was produced using the resin coating material in Preparation 3 in a similar manner to Example 1 except that printing was performed such that the area ratio of the exposed surface of the indicating layer was 11% with respect to the surface area of one surface of the label.

Example 4

A label was produced using the resin coating material in Preparation 3 in a similar manner to Example 1 except that printing was performed such that the area ratio of the exposed surface of the indicating layer was 25% with respect to the surface area of one surface of the label.

Example 5

A label was produced using the resin coating material in Preparation 3 in a similar manner to Example 1 except that printing was performed such that the area ratio of the exposed surface of the indicating layer was 40% with respect to the surface area of one surface of the label.

Example 6

A label was produced using the resin coating material in Preparation 3 in a similar manner to Example 1 except that printing was performed such that the area ratio of the exposed surface of the indicating layer was 50% with respect to the surface area of one surface of the label.

Example 7

A label was produced using the resin coating material in Preparation 3 in a similar manner to Example 1 except that printing was performed such that the area ratio of the exposed surface of the indicating layer was 75% with respect to the surface area of one surface of the label.

Example 8

By replacing the melamine crosslinking agent MS-11 in Preparation 1 with a benzoguanamine crosslinking agent BL-60 (manufactured by Sanwa Chemicals Co., Ltd.), printing was performed using the resin coating material in Preparation 3 such that the area ratio of the exposed surface of the indicating layer was 11% with respect to the surface area of one surface of the label to produce a label in a similar manner to Example 1.

Example 9

By replacing the melamine crosslinking agent MS-11 in Preparation 1 with a urea crosslinking agent MX-202 (manufactured by Sanwa Chemicals Co., Ltd.), printing was performed using the resin coating material in Preparation 3 such that the area ratio of the exposed surface of the indicating layer was 11% with respect to the surface area of one surface of the label to produce a label in a similar manner to Example 1.

Comparative Example 1

By replacing the melamine crosslinking agent MS-11 in Preparation 1 with an isocyanate crosslinking agent Coronate HK (manufactured by Nippon Polyurethane Industry Co., Ltd.), printing was performed using the resin coating material in Preparation 3 such that the area ratio of the exposed surface of the indicating layer was 11% with respect to the surface area of one surface of the label to produce a label in a similar manner to Example 1.

Next, an indicating layer sample having a different thickness from the indicating layer used for each of the labels in Examples 1 to 9 and Comparative Example was produced. The indicating layer sample was produced as follows. First, the resin coating material in Preparation 3 was applied onto a surface of a surface-treated PET film (E-7004 manufactured by Toyobo Co., Ltd). At this time, the resin coating material was applied so as to have a thickness of 50 micrometers after being heated and dried. Next, the film onto which the resin coating material in Preparation 3 had been applied was heated at 80° C. for 1.5 minutes. Next, the resin coating material cured by heating was peeled from the PET film and was cut to obtain three indicating layer samples in a square shape having a side of 10 cm.

A first colored layer sample having a different thickness from the first colored layer used for the labels in Examples 1 to 7, a first colored layer sample having a different thickness from the first colored layer used for the label in Example 8, a first colored layer sample having a different thickness from the first colored layer used for the label in Example 9, and a first colored layer sample having a different thickness from the first colored layer used for the label in Comparative Example 1 were produced. Each of the first colored layer samples was produced as follows.

The first colored layer sample according to the labels in Examples 1 to 7 was produced in a similar manner to the indicating layer sample except that the resin coating material of the first colored layer sample according to the labels in Examples 1 to 7 in Preparation 1 was heated at 150° C. for three minutes. In this way, three first colored layer samples each having a thickness of 50 micrometers after being heated and dried, used for the labels in Examples 1 to 7, were obtained.

The first colored layer sample according to the label in Example 8 was produced in a similar manner to the first colored layer sample according to the labels in Examples 1 to 7 except that the resin coating material used for the first colored layer in Example 8 was used. In this way, three first colored layer samples each having a different thickness from the first colored layer used for the label in Example 8 were obtained.

The first colored layer sample according to the label in Example 9 was produced in a similar manner to the first colored layer sample according to the labels in Examples 1 to 7 except that the resin coating material used for the first colored layer in Example 9 was used. In this way, three first colored layer samples each having a different thickness from the first colored layer used for the label in Example 9 were obtained.

The first colored layer sample according to the label in Comparative Example 1 was produced in a similar manner to the first colored layer sample according to the labels in Examples 1 to 7 except that the resin coating material used for the first colored layer in Comparative Example 1 was used. In this way, three first colored layer samples each having a different thickness from the first colored layer used for the label in Comparative Example 1 were obtained.

Next, the curing shrinkage ratio of each sample was measured. Measurement was performed as follows. First, the lengths of each sample in the vertical direction and the horizontal direction were measured. Next, each sample was allowed to stand in an environment of 80° C. for 24 hours, and then was allowed to stand in an environment of 23° C. and a humidity of 50%. Thereafter, the lengths of each sample in the vertical direction and the horizontal direction were measured again. The curing shrinkage ratio of each sample was determined using the following formula. Each sample was shrunk by being allowed to stand in an environment of 80° C. In the following formula, Lpv represents a length in the vertical direction before shrinkage, Lph represents a length in the horizontal direction before shrinkage, Lav represents a length in the vertical direction after shrinkage, Lah represents a length in the horizontal direction after shrinkage, Srv represents a curing shrinkage ratio in the vertical direction, Srh represents a curing shrinkage ratio in the horizontal direction, and Sr represents a shrinkage ratio of each sample.

$$Srv=\{(Lpv-Lav)/Lpv\}\times 100 \tag{1}$$

$$Srh=\{(Lph-Lah)/Lph\}\times 100 \tag{2}$$

$$Sr=\{(Srv^2+Srh^2)^{1/2}\}/2 \tag{3}$$

By determining an average of the shrinkage ratios of the three samples obtained in formula (3) above, a curing shrinkage ratio of the indicating layer sample and a curing shrinkage ratio of each first colored layer sample ware determined. Results thereof are shown in Table 1.

TABLE 1

|  | Example 1~7 | Example 8 | Example 9 | Comparative Example 1 |
|---|---|---|---|---|
| curing shrinkage ratio of indicating layer | 0.35% | | | |
| curing shrinkage ratio of first colored layer | 1.5% | 1.2% | 1.3% | 0.31% |

From Table 1, it has been able to confirm that the first colored layer has a larger curing shrinkage ratio than the indicating layer in the labels in Examples 1 to 9.

Next, Table 2 below shows the area ratio of an exposed surface, the crosslinking agent used for the resin coating material in Preparation 1, adhesion, and cracking in Examples 1 to 9 and Comparative Example 1 above.

TABLE 2

|  | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| ratio of exposed surface | 0.8% | 1% | 11% | 25% | 40% | 50% | 75% | 11% | 11% | 11% |
| crosslinking agent used for resin coating material in Preparation 1 | MS-11 | MS-11 | MS-11 | MS-11 | MS-11 | MS-11 | MS-11 | BL-60 | MX-202 | Coronate HK |
| adhesion | good | excelent | excellent | excellent | excellent | good | good | excellent | excellent | poor |
| cracking | acceptable | good | good | good | good | acceptable | acceptable | good | good | poor |

MS-11: melamine crosslinking agent
BL-60: benzoguanamine crosslinking agent
MX-202: urea crosslinking agent
Coronate HK: isocyanate crosslinking agent The adhesion in Table 2 above was evaluated as follows. That is, a produced label was cut into a 7.5 cm square to obtain a specimen. The specimen was allowed to stand in an environment of 150° C. for 1000 hours, was then immersed in a 0.1% Rhodamine aqueous solution for 24 hours, was taken out of the Rhodamine aqueous solution, and an excess aqueous solution attached to the specimen was wiped off with a cloth. Thereafter, it was visually observed whether coloration by Rhodamine has been caused due to invasion of the Rhodamine aqueous solution between the Indicating layer and the first colored layer.

When coloration by Rhodamine was observed, it was assumed that there was a gap. When there was no gap, the specimen was evaluated to be excellent. When a gap was confirmed partially but there was no practical problem, the specimen was evaluated to be good. When a gap was confirmed significantly, the specimen was evaluated to be poor.

The cracking in Table 2 above was evaluated as follows. That is, the produced label was allowed to stand in an environment of 150° C. for 1000 hours. Thereafter, cracking was visually observed on a surface of the first colored layer on a side of the indicating layer.

When cracking was not observed on the surface of the first colored layer on the side of the indicating layer, the label was evaluated to be good. When cracking was confirmed partially but there was no practical problem, the label was evaluated to be acceptable. When cracking was observed, the label was evaluated to be poor.

It has been found that adhesion between the layers is higher and less cracking is caused in the labels in Examples 1 to 9 in which the melamine crosslinking agent MS-11, the benzoguanamine crosslinking agent BL-60, and the urea crosslinking agent MX-202 are used as crosslinking agents of the first colored layer than the label in Comparative Example 1 in which the isocyanate crosslinking agent Coronate HK is used. The reason is considered that the first colored layer has a larger curing shrinkage ratio than the indicating layer as shown in Table 1 and therefore the indicating layer is held by the first colored layer more firmly. In Table 2 above, adhesion in each of Examples 6 and 7 is evaluated to be good. Example 7 had no practical problem but had adhesion inferior to Example 6. Therefore, from Examples 2 to 6, it has been found that the area ratio of the exposed surface of the indicating layer is preferably 1% or more and 50% or less in order to enhance adhesion between the layers and suppress cracking. In addition, from Examples 2 to 5, it has been found that the area ratio of the exposed surface of the indicating layer is more preferably 1% or more and 40% or leas in order to obtain excellent adhesion and suppress cracking.

REFERENCE SIGNS LIST

1 . . . label
10 . . . first colored layer
20 . . . second colored layer
30 . . . indicating layer
40 . . . substrate
50, 60, 70 . . . resin coating material
P1 . . . indicating layer forming step
P2 . . . first colored layer forming step
P3 . . . second colored layer forming step
P4 . . . peeling step
80 . . . removing part
L . . . laser

The invention claimed is:

1. A label comprising:
a cured first colored layer containing a crosslinking agent selected from the group consisting of a melamine crosslinking agent, a benzoguanamine crosslinking agent and a urea crosslinking agent;
a second colored layer having a different color from the first colored layer; and
a cured indicating layer having a different color from both the first colored layer and the second colored layer, the cured indicating layer containing an isocyanate crosslinking agent, wherein
the indicating layer is embedded in the first colored layer, thereby providing an exposed surface of the indicating layer within an exposed surface of the first colored layer, the second colored layer is laminated on the other surface of the first colored layer, and the first colored layer having a greater curing shrinkage ratio than that of the indicating layer.

2. The label according to claim 1, wherein an area ratio of the exposed surface of the indicating layer is 1 to 50% with respect to a surface area of an exposed surface of the label.

3. The label according to claim 2, wherein the area ratio of the exposed surface of the indicating layer is 1 to 40% with respect to a surface area of said exposed surface of the label.

4. The label according to claim 1, wherein said indicating layer comprises a resin having a functional group, and said crosslinking agent in said first colored layer reacts with said functional group.

5. The label according to claim 1, wherein said first colored layer comprises a resin having a functional group, said second colored layer comprises a crosslinking agent, and said indicating layer comprises a resin having a functional group, and said crosslinking agent in said second colored layer reacts with both the functional group of said resin included in the first colored layer and the functional group of said resin included in the indicating layer.

6. A method for producing a label according to claim 1, comprising the steps of:

forming said indicating layer by applying a resin coating material onto one surface of a substrate and then heating the resin coating material;

forming said first colored layer by applying a resin coating material having a different color from the resin coating material used in forming the indicating layer onto the one surface of the substrate and a surface of the indicating layer and then heating the resin coating material;

forming said second colored layer by applying a resin coating material having a different color from the resin coating material used in forming the indicating layer and the resin coating material used in forming the first colored layer onto a surface of the first colored layer and then heating the resin coating material; and peeling the substrate from the indicating layer and the first colored layer.

7. The label according to claim 2, wherein said indicating layer comprises a resin having a functional group, and said crosslinking agent in said first colored layer reacts with said functional group.

8. The label according to claim 3, wherein said indicating layer comprises a resin having a functional group, and said crosslinking agent in said first colored layer reacts with said functional group.

9. The label according to claim 2, wherein said first colored layer comprises a resin having a functional group, said second colored layer comprises a crosslinking agent, said indicating layer comprises a resin having a functional group, and said crosslinking agent in said second colored layer reacts with both the functional group of said resin included in the first colored layer and the functional group of said resin included in the indicating layer.

10. The label according to claim 3, wherein said first colored layer comprises a resin having a functional group, said second colored layer comprises a crosslinking agent, said indicating layer comprises a resin having a functional group, and said crosslinking agent in said second colored layer reacts with both the functional group of said resin included in the first colored layer and the functional group of said resin included in the indicating layer.

11. The label according to claim 4, wherein said first colored layer comprises a resin having a functional group, said second colored layer comprises a crosslinking agent, and the crosslinking agent of said second colored layer reacts with both the functional group of said resin included in the first colored layer and the functional group of said resin included in the indicating layer.

12. The label according to claim 7, wherein said first colored layer comprises a resin having a functional group, said second colored layer comprises a crosslinking agent, and the crosslinking agent of said second colored layer reacts with both the functional group of said resin included in the first colored layer and the functional group of said resin included in the indicating layer.

13. The label according to claim 8, wherein said first colored layer comprises a resin having a functional group, said second colored layer comprises a crosslinking agent, and the crosslinking agent of said second colored layer reacts with both the functional group of said resin included in the first colored layer and the functional group of said resin included in the indicating layer.

14. The label according to claim 2, wherein the first colored layer, the second colored layer and the indicating layer each comprise a colorant independently selected from the group consisting of an inorganic pigment, an organic pigment, an azo pigment, a condensed polycyclic pigment and a metal complex salt pigment.

15. The label according to claim 2, wherein the first colored layer and the second colored layer each comprise a colorant selected from the group consisting of an inorganic pigment, an organic pigment, an azo pigment, a condensed polycyclic pigment and a metal complex salt pigment.

16. The label according to claim 14, wherein the indicating layer is transparent.

17. The label according to claim 15, wherein the indicating layer is transparent.

18. The label according to claim 3, wherein the area ratio of the exposed surface of the indicating layer is 1 to 30% with respect to a surface area of said exposed surface of the label.

19. The label according to claim 15, wherein the thickness of the first colored layer is from 3 to 30 micrometers.

20. The label according to claim 19, wherein the thickness of the second colored layer is from 40 to 120 micrometers.

21. The label according to claim 20, wherein the thickness of the indicating layer is from 0.5 to 30 micrometers.

22. The label according to claim 2, wherein said exposed surface of said indicating layer is flush with said exposed surface of said first colored layer.

23. The label according to claim 1, wherein the color of the indicating layer and the color of the first layer can be removed by laser light to provide a conspicuous or inconspicuous visual indication.

* * * * *

UNITED STATES PATENT AND TRADEMARK OFFICE
CERTIFICATE OF CORRECTION

PATENT NO. : 10,086,592 B2
APPLICATION NO. : 15/030910
DATED : October 2, 2018
INVENTOR(S) : Satoshi Kyoda et al.

It is certified that error appears in the above-identified patent and that said Letters Patent is hereby corrected as shown below:

In the Specification

Column 1:
Line 40, "object," should read --object--.

Column 2:
Line 21, "lees" should read --less--.

Column 5:
Line 31, "costing" should read --coating--.

Column 6:
Line 53, "naphtol" should read --naphthol--.

Column 8:
Line 9, "index" should read --Index--,
Line 14, "sine" should read --zinc--,
Line 19, "materiel" should read --material--, and
Line 23, "cross" should read --cross- --.

Column 9:
Line 40, "used" should be deleted, and
Line 44, "used" should be deleted.

Column 10:
Line 64, "caring" should read --curing--.

Column 11:
Line 11, "pealed" should read --peeled--.

Signed and Sealed this
Fifth Day of February, 2019

Andrei Iancu
*Director of the United States Patent and Trademark Office*

CERTIFICATE OF CORRECTION (continued)
U.S. Pat. No. 10,086,592 B2

Column 14:
Line 66, "ware" should read --were--.

Column 15:
Line 10, "able to confirm" should read --confirmed--,
Line 12, "excelent" should read --excellent--,
Line 42, "has" should read --had--, and
Line 44, "Indicating" should read --indicating--.

Column 16:
Line 34, "leas" should read --less--.

In the Claims

Column 17:
Line 19, "and" should be deleted.